United States Patent
Qu et al.

(10) Patent No.: US 10,835,997 B2
(45) Date of Patent: Nov. 17, 2020

(54) SUPER HIGH STRENGTH GAS PROTECTION WELDING WIRE CONTAINING V AND MANUFACTURING METHOD THEREFOR

(71) Applicant: BAOSHAN IRON & STEEL CO., LTD., Shanghai (CN)

(72) Inventors: Zhaoxia Qu, Shanghai (CN); Lei Xu, Shanghai (CN); Liqian Xia, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 498 days.

(21) Appl. No.: 15/531,403

(22) PCT Filed: Jun. 30, 2015

(86) PCT No.: PCT/CN2015/082733
§ 371 (c)(1),
(2) Date: Oct. 19, 2017

(87) PCT Pub. No.: WO2016/082544
PCT Pub. Date: Jun. 2, 2016

(65) Prior Publication Data
US 2018/0169800 A1    Jun. 21, 2018

(30) Foreign Application Priority Data

Nov. 27, 2014 (CN) .......................... 2014 1 0705499

(51) Int. Cl.
| | | |
|---|---|---|
| *B23K 35/30* | (2006.01) | |
| *B23K 35/40* | (2006.01) | |
| *B23K 35/00* | (2006.01) | |
| *B23K 35/22* | (2006.01) | |
| *B23K 9/173* | (2006.01) | |

(52) U.S. Cl.
CPC .......... *B23K 35/3073* (2013.01); *B23K 35/00* (2013.01); *B23K 35/22* (2013.01); *B23K 35/30* (2013.01); *B23K 35/3053* (2013.01); *B23K 35/40* (2013.01); *B23K 9/173* (2013.01)

(58) Field of Classification Search
CPC ..... B23K 35/3073; B23K 35/40; B23K 9/173
USPC ................................ 148/504, 506, 522, 536
See application file for complete search history.

(56) References Cited

U.S. PATENT DOCUMENTS

2015/0034215 A1*  2/2015  Schulz ................ C21D 8/0205
                                                           148/537

FOREIGN PATENT DOCUMENTS

| CN | 1529765 A | 9/2004 |
|---|---|---|
| CN | 101274396 A | 10/2008 |
| CN | 101811232 A | 8/2010 |
| CN | 103100801 A * | 5/2013 |
| CN | 104551441 A | 4/2015 |
| JP | 05-200582 * | 8/1993 |
| JP | 5-200582 A | 8/1993 |
| JP | 8-267273 A | 10/1996 |
| JP | 9168889 A | 6/1997 |
| WO | WO-2013139319 A1 * | 9/2013 |

OTHER PUBLICATIONS

PCT/CN2015/082733 International Search Report and Written Opinion, dated Oct. 12, 2015.

\* cited by examiner

*Primary Examiner* — Thien S Tran
(74) *Attorney, Agent, or Firm* — Thomas | Horstemeyer, LLP

(57) ABSTRACT

Provided is a superhigh strength gas shielded welding wire containing V, the mass percentage contents of the chemical elements thereof being: 0.08-0.12% of C, 0.65-0.80% of Si, 1.80-1.95% of Mn, 0<Cu≤0.25%, 0.20-0.40% of Cr, 0.2-0.6% of Mo, 1.30-1.80% of Ni, 0.08-0.20% of Ti, 0.01-0.05% of V, 0.0070-0.0130% of N, and the balance of Fe and other inevitable impurities. Also provided is a method for manufacturing the welding wire. A weld metal obtained after welding with said welding wire has a higher strength and toughness, and also has a good crack resistance, weldability and plasticity.

9 Claims, 5 Drawing Sheets a) b)

a) b)

SUPER HIGH STRENGTH GAS PROTECTION WELDING WIRE CONTAINING V AND MANUFACTURING METHOD THEREFOR

CROSS-REFERENCE TO RELATED APPLICATIONS

This application is a 371 U.S. National Phase of PCT International Application No. PCT/CN2015/082733, filed on Jun. 30, 2015, which claims benefit and priority to Chinese patent application No. 201410705499.6, filed on Nov. 27, 2014. Both of the above-referenced applications are incorporated by reference herein in their entirety.

TECHNICAL FIELD

The present invention relates to a welding material and a manufacturing method therefor, and particularly to a gas shielded welding material and a manufacturing method therefor.

BACKGROUND ART

With the high parameter, large size and lightweight development requirements for modern mechanical equipment, the use of steels with a strength grade of 90 kg and higher has also become the first choice of many domestic industry designs and manufactures, for example, cranes and concrete pump trucks in the engineering machinery manufacturing field, for another example, for coal machine hydraulic supports in the mining machinery manufacturing field, and for a further example, hydropower pressure steel pipes in the field of hydropower industry. Moreover, there is a large demand of steels having higher strength grades in all manufacture fields related to harbour machinery, ocean structures, passenger and cargo vehicles, special vehicles, etc. Moreover, since gas shielded welding is an efficient, inexpensive and reliable automatic or semi-automatic welding method, such a gas shielded welding method can be widely used in all the above related design and manufacturing fields.

In general, welding materials for steels with a strength grade of 90 kg and higher may have a higher alloy content, and the carbon equivalents of the weld metal may also be higher, and for this reason, the crack resistance of the weld will be relatively poor and the production cost will also be increased accordingly. For the convenience of downstream users to process steel materials, for example, by processing techniques such as blanking, cutting, welding and bend forming, the carbon equivalents of welding materials matching steels of higher strength grades should also be reduced as far as possible by using micro-alloying elements. In general, with the increase in tensile strength, the low-temperature impact toughness of a superhigh strength welding material will be dramatically reduced, and in order to enable the superhigh strength welding material to also have a good toughness performance, 2 wt. % or more of Ni may be usually added in the prior art; however, the addition of element Ni will result in a significant increase in the cost of the welding material.

A Chinese patent document published on Dec. 8, 2010 with publication No. CN 101905390 A, entitled "Low alloy, high-strength gas shielded welding wire", relates to a low alloy, high-strength gas shielded welding wire, the contents of chemical elements by mass in percentage of the welding wire being: 0.06-0.12% of C, 0.30-0.60% of Si, 1.40-2.00% of Mn, P≤0.025%, S≤0.015%, 0.30-0.70% of Cr, 1.0-1.6% of Ni, 0.28-0.5% of W, 0.25-0.50% of Cu, 0.05-0.15% of Re, and the balance of Fe and inevitable impurities. Elements W and Re are added to the shielded welding wire involved in this Chinese patent document.

A Chinese patent document (referred to as patent document 2 hereinafter) published on Aug. 6, 2008 with publication No. CN 101234457 A, entitled "High-strength, high-toughness gas shielded welding wire", discloses a high-strength, high toughness gas shielded welding wire. The chemical components of the welding wire (in percentage by mass, wt. %) are: 0.04-0.10% of C, 0.30-0.80% of Si, 1.30-2.0% of Mn, 0.40-0.89% of Ni, 0.20-0.50% of Cr, 0.20-0.60% of Mo, 0.56-0.80% of Cu, 0.05-0.20% of Ti, 0.002-0.010% of B, P≤0.020, S≤0.015, ALs≤0.03, and the balance of Fe and inevitable impurities. A large amount of element Cu is added to the gas shielded welding wires disclosed in the above-mentioned Chinese patent document, and the composite microalloying effect of Ti and B is utilized therein.

A Chinese patent document published on May 27, 2009 with publication No. CN 101439446 A, entitled "High-strength steel, high-toughness gas shielded welding wire", relates to a high-strength steel, high toughness gas shielded welding wire, the chemical components thereof (in percentage by mass, wt. %) include: 0.05-0.13% of C, 1.4-1.9% of Mn, 0.4-0.8% of Si, 0.4-0.8% of Cr, 1.5-1.8% of Ni, 0.3-0.8% of Mo, 0.06-0.25% of Ti, 0-0.60% of Cu, S≤0.025, P≤0.025, and the balance of Fe and inevitable impurity elements. The microalloying effect of Ti alone is used in the Chinese patent document.

It can be seen from the technical solutions disclosed in the above-mentioned Chinese patent document that the high strength of a high-strength welding material is mainly derived from the addition of a certain amount of hardenability alloying elements (such as elements C, Cr, Mo, W, Ni and Cu) so as to increase the strength of a weld metal.

SUMMARY OF THE INVENTION

One of the objects of the present invention is to provide a superhigh strength gas shielded welding wire containing V. A weld metal formed by welding with the welding wire has both a higher strength and a higher toughness; moreover, the weld metal formed by welding with the welding wire further has a good crack resistance, a better weldability and a good plasticity.

In order to achieve the above-mentioned object, the present invention provides a superhigh strength gas shielded welding wire containing V, the mass percentage contents of the chemical elements thereof being:

0.08-0.12% of C, 0.65-0.80% of Si, 1.80-1.95% of Mn, 0<Cu≤0.25%, 0.20-0.40% of Cr, 0.2-0.6% of Mo, 1.30-1.80% of Ni, 0.08-0.20% of Ti, 0.01-0.05% of V, 0.0070-0.0130% of N, and the balance of Fe and other inevitable impurities.

In this technical solution, the inevitable impurities further include elements Al, O and H in addition to elements P and S, and as inevitable impurity elements, the contents of these impurity elements should be as low as possible. In a wire rod for the superhigh strength gas shielded welding wire, both phosphorus and sulphur are harmful to the plasticity and toughness of the weld metal, and therefore, the contents thereof should be strictly controlled; in the technical solution of the present invention, the content of phosphorus can be controlled at ≤0.015 wt. %, and the content of sulphur can be controlled at ≤0.010 wt. %. In addition, in order to reduce the generation of inclusions, improve the plasticity and toughness of the weld metal and improve the cleanliness of the weld metal, Al can be controlled at ≤0.02 wt. %; in addition, in order to improve the toughness of the weld metal, O can be controlled at ≤0.005 wt. % and H is controlled at ≤0.0002 wt. %.

The design principle of the various chemical elements in this technical solution is:

C: Carbon can effectively improve the strength of the weld metal; however, an excessively high carbon content may be detrimental to the plasticity, toughness and cold crack sensitivity of the weld metal; therefore, based on the technical solution of the present invention, the carbon content should be controlled at 0.08-0.12 wt. %.

Si: Silicon is solid-dissolved in ferrite and austenite and can improve the strength of the weld metal. Moreover, the addition of a certain amount of silicon can further increase the flowability of the weld metal, so that the wire rod for the welding wire has good welding process properties in the welding process. However, an excessively high silicon content may result in a sharp decrease in toughness of the weld metal, and therefore, the mass percentage content of silicon in the present invention is designed to be 0.65-0.80%.

Mn: Manganese is one of the beneficial elements which increase the toughness of the weld metal. An increase in manganese content is conducive to the prevention of hot cracks occurring to the weld metal and to the deoxidation of the weld metal. However, once the manganese content is too high, it is easy to cause segregation and cracks occurring to a welding wire steel slab, and it is also easy to cause an excessively high carbon equivalent in the weld metal and reduce the toughness of the weld metal. Therefore, the content of element manganese in the present invention should be controlled at 1.80-1.95 wt. %.

Cu: The addition of a certain amount of copper can effectively prevent the occurrence of hydrogen embrittlement, which is very important for a high-strength welding wire steel. When the copper content is less than 0.5 wt. %, with the increase of the copper content, the strength of the weld metal gradually increases due to the effect of solid solution strengthening. Therefore, the mass percentage content of copper in the present invention is set to 0<Cu≤0.25%. As a more preferred setting range, the content in percentage by mass of copper is 0.12-0.20%.

Cr: Chromium can improve the hardenability of the weld metal, thereby improving the strength thereof. However, an excessively high content of chromium can reduce the toughness of the weld metal, and can further increase the cold crack sensitivity of the weld metal. A certain content of element chromium can play a role in refining ferrite grains, thereby increasing the strength and toughness of a secondary structure of the weld metal. In view of this, the chromium content in the technical solution of the present invention is controlled at 0.20-0.40 wt. %.

Mo: Molybdenum can delay the transformation of proeutectoid ferrite, facilitate the formation of acicular ferrite and bainite and has an effect of grain refinement, thereby further increasing both the strength and toughness of the weld metal. Furthermore, molybdenum is also an element that reduces the temper brittleness of the weld metal, and can improve the temper resistance of a multi-layer and multi-pass weld metal. However, an excessively high content of element molybdenum can produce more quench-hardened structures in the weld structure, increasing the cold crack sensitivity of the weld metal. In addition, the cost of adding alloying element molybdenum is also relatively high. On this basis, the content of molybdenum in the superhigh strength gas shielded welding wire containing V of the present invention is controlled at 0.20-0.60 wt. %. Preferably, the content of molybdenum can be further controlled at 0.30-0.55 wt. %.

Ni: Nickel can improve the toughness of the weld metal, especially the low-temperature impact toughness of the weld metal, and reduce the brittle transition temperature. In a certain range of addition of the content thereof, with the increase of the nickel content, the strength of the weld metal can be increased; however, once the nickel content exceeds a certain range, the strength of the weld metal will not increase with the increase of the content thereof. In addition, element nickel is an expensive alloying element metal, it is necessary to consider the impact on the production cost when performing the addition. Therefore, the nickel content in the technical solution of the present invention is set to be 1.30-1.80 wt. %. Further, the nickel content can also be set to be 1.50-1.70 wt. %.

Ti, V and N: For the superhigh strength gas shielded welding wire, micro-alloying elements have to be fully utilized in order to endow same with a good weldability. In addition to micro-alloying using element titanium, element vanadium is further needed for micro-alloying in the technical solution of the present invention. After the micro-alloying with vanadium element, the addition of element nitrogen can significantly improve the strengthening effect, and in this regard, nitrogen in this technical solution cannot be treated as an impurity element and has to be maintained within a certain range of content; however, when the addition amount of element N is too high, the range of austenite region can be expanded, easily forming coarse austenite and M-A island components, and these structures will reduce the toughness of the weld structure. The composite micro-alloying of vanadium and titanium improves the stability of undercooled austenite, and reduces the phase transition temperature of the material so as to refine austenite grains and increase the austenite grain boundary, thereby facilitating ferrite and bainite nucleation, achieving the effect of refining the secondary structure and improving the structure morphology and sub-structure, thus facilitating the improvement of the weld structure toughness. The addition of an appropriate amount of element titanium to a weld with vanadium and nitrogen coexisting can form a superfine non-coherent state carbonitride of titanium, which not only avoids the formation of a coherent precipitate phase from nitrogen and vanadium which is detrimental to the mechanical properties of the weld metal, but also facilitates the improvement of the toughness of the weld metal. Thus, in the superhigh strength gas shielded welding wire containing V of the present invention, it is necessary to control the titanium content at 0.08-0.20 wt. %, the vanadium content at 0.01-0.05 wt. % and the nitrogen content at 0.0070-0.0130 wt. %.

Preferably, the titanium content can be controlled at 0.10-0.16 wt. %.

Preferably, the vanadium content can be controlled at 0.015-0.035 wt. %.

Compared with the prior art, the superhigh strength gas shielded welding wire containing V of the present invention does not contain micro-alloying elements W and Re. Moreover, the addition amount of alloying elements in the welding wire of the present invention is smaller, so that the production cost of the welding wire is relatively lower, and therefore the welding wire has better economic benefits.

In addition, compared with the prior art, element Cu in the superhigh strength gas shielded welding wire containing V of the present invention mainly plays a role of solid solution strengthening, whereas element Cu in the prior art plays a role of precipitation strengthening in a technical solution disclosing same.

Moreover, compared with the prior art, the superhigh strength gas shielded welding wire containing V of the present invention further has element V added on the basis of the addition of element Ti so as to realize composite micro-alloying of Ti and V. Furthermore, precipitates of Ti(C,N) and V(C,N) composite micro-alloying are further formed by the reasonable proportioning of Ti, V and C, N; thus, the stability of the undercooled austenite is improved, the phase transition temperature of the material is reduced, and the austenite grains are refined.

In the technical solution of the present invention, the micro-alloying element V is added, and N serves as an alloying element which needs to be controlled within a certain range of addition, rather than an inevitable impurity element which is desired to be as low as possible in content. In the technical solution of the present invention, on the basis of the addition of element V for micro-alloying, the addition amount of element N is controlled, thereby greatly improving the strengthening effect.

Further, the elements Cr, V and Mo in the superhigh strength gas shielded welding wire containing V of the present invention further need to satisfy: 0.46%≤Cr+V+Mo≤0.88%.

Limiting the minimum value of the sum of the above-mentioned three elements to 0.46% is to ensure that the strength possessed by the weld metal formed from the welding wire meets the requirements; the weld metal is an as-cast structure formed in a special heating and cooling process, and the mechanical properties thereof mainly result from a certain alloy content that the weld metal has; and limiting the maximum value of the sum of the above-mentioned three elements to 0.88% is because it should be ensured that the weld metal formed from the welding wire steel has a lower carbon equivalent, so as to ensure its good weldability. For this technical solution, the carbon equivalent equation for the weld metal is: $C_{eq}=C+Mn/6+(Ni+Cu)/15+(Cr+Mo+V)/5$.

Further, the elements Cr and Cu in the superhigh strength gas shielded welding wire containing V of the present invention further satisfy: 0.20%≤Cr+Cu≤0.48%.

Redox reaction may occur to the welding wire in the welding process, and for the gas shielded welding wire, the burning loss of elements silicon and manganese is the greatest, but the burning loss of elements chromium and copper is not great; and due to the effects of the two in the composition design, there is necessarily a lowest limit; moreover, in order to reducing the cold crack sensitivity coefficient of the weld metal to the greatest extent, the maximum value is defined in this technical solution. For this technical solution, the welding cold crack sensitivity index equation for the weld metal is: $P_{cm}=C+Si/30+(Mn+Cu+Cr)/20+Ni/60+Mo/15+V/10$.

Further, the elements V and Ti in the superhigh strength gas shielded welding wire containing V of the present invention further need to satisfy: 0.10%≤V+Ti≤0.22%.

In order to reduce the cost of the welding wire steel and endow same with a good weldability, it is necessary to maximize the effect of micro-alloying, and therefore the total addition amount of V and Ti in this technical solution is limited to be ≥0.1%; however, the inventors have found that if the addition amount of the two elements is higher than 0.22%, the properties of the weld metal may be deteriorated on the contrary.

Further, the interpass temperature is controlled between 100° C. and 165° C., the welding heat input is 8-13 kJ/cm, and the weld surface structure of a deposited metal obtained from said superhigh strength gas shielded welding wire containing V of the present invention is bainite.

Further, the weld surface structure of said obtained deposited metal further comprises irregular ferrite in a volume fraction of 2-5%.

Further, the interpass temperature is controlled between 100° C. and 165° C., the welding heat input is 8-13 kJ/cm, and the structures of weld interpass heat affected zones of the deposited metal obtained from said superhigh strength gas shielded welding wire containing V of the present invention are all lower bainite.

Further, the interpass temperature is controlled between 100° C. and 165° C., the welding heat input is 8-13 kJ/cm, and the deposited metal obtained from said superhigh strength gas shielded welding wire containing V of the present invention has precipitates, the precipitates being Ti(C,N) and V(C,N).

In addition, the present invention further provides a method for manufacturing the above-mentioned welding wire, comprising the steps of: smelting, refining, casting, hot rolling, slow cooling, spinning into wire rods, pickling, rough drawing, heat treatment, fine drawing and copper plating, wherein the heat treatment temperature in the heat treatment step is 680-720° C.

In the process for manufacturing the superhigh strength welding wire, the welding wire becomes thinner due to being continuously drawn, there is a greater work hardening effect, and the stability of the drawing process will be affected; therefore, it is necessary to perform a heat treatment, for the purpose of eliminating a strengthening effect resulting form the processing process, such that the drawing process is performed successfully. For the superhigh strength welding wire of the present invention, it mainly has deformation strengthening and second phase particle strengthening in the drawing process; therefore, in the design of the heat treatment process, the elimination of the work hardening effect needs to be taken into consideration, and therefore the heat treatment temperature in this technical solution is set to be 680-720° C. On this basis, a slow cooling manner should be adopted as far as possible, in order to avoid the production of fine grain structure and quench-hardened structure.

Ti, V and N micro-alloying is used in the superhigh strength gas shielded welding wire containing V of the present invention, so that the formed weld metal has a high toughness and a good weldability.

The alloying effect of elements such as C, Cr, Mo, Mn and Cu is used in the superhigh strength gas shielded welding wire containing V of the present invention so as to improve the strength and toughness of the obtained weld metal.

Moreover, the weld metal formed from the superhigh strength gas shielded welding wire containing V of the present invention further has a good crack resistance and an excellent plasticity, as well as good economic benefits.

After gas shielded welding using the welding wire of the present invention, the formed weld metal has a yield strength Rel of 780-930 MPa, a tensile strength $R_m$ of 880-1060 MPa and an elongation A of 14-20%, with the mean values of Charpy V-notch impact energy at −20° C. and −40° C. reaching not less than 80 J and 50 J, respectively. Therefore, the welding wire of the present invention can be widely applied to the gas shielded welding of superhigh strength steels having a grade of 90 kg or higher.

DETAILED DESCRIPTION OF EMBODIMENTS

Figure 1:
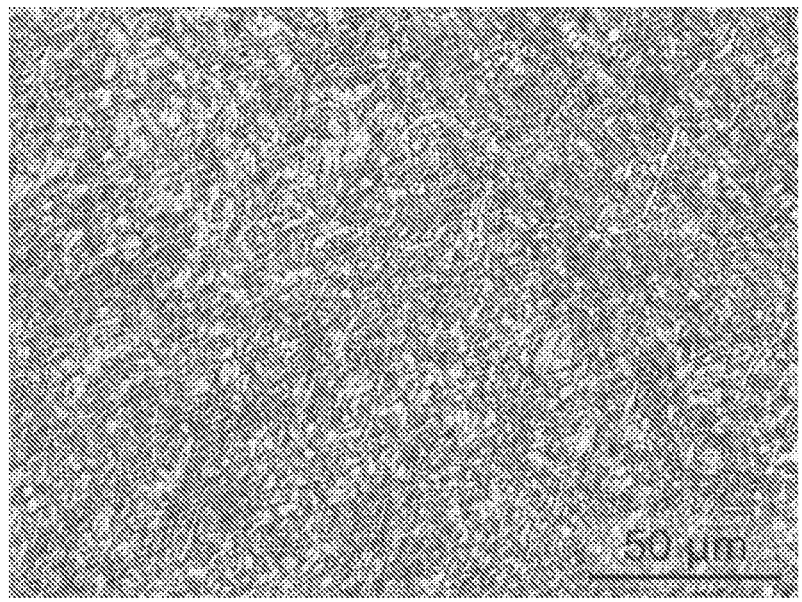
FIG. 1 is a microstructure photograph of a weld surface of a deposited metal obtained from a welding wire in Example 1.

The superhigh strength gas shielded welding wire containing V of the present invention and the manufacturing method therefor are further explained and described below in conjunction with the accompanying drawings and specific examples; however, the explanations and description do not constitute an inappropriate limitation to the technical solution of the present invention.

Table 1 shows the mass percentages of the chemical components of the welding wires in Examples 1-5 of the present invention.

The welding wires in Examples 1-5 of the present invention are manufactured by the following steps: smelting, refining, casting, hot rolling, slow cooling, spinning into wire rods, pickling, rough drawing, heat treatment, fine drawing and copper plating. These steps are basically common steps in the welding wire manufacturing field, and therefore no more detailed description is provided with regard to these manufacturing steps in this technical solution. The difference merely lies in that the heat treatment step is different from the prior art, which is closely related to the implementation effect of the present invention. In this technical solution, the heat treatment temperature is 680-720° C., and the cooling process is slow cooling, with a cooling time of 5 hours.

Table 2 lists the heat treatment temperatures in the method for manufacturing the welding wires of Examples 1-5 of the present invention.

TABLE 2

| | No. | | | | |
|---|---|---|---|---|---|
| | Example 1 | Example 2 | Example 3 | Example 4 | Example 5 |
| Heat treatment temperature (° C.) | 700° C. | 680° C. | 710° C. | 690° C. | 720° C. |

A low-alloy high-strength steel plate having a thickness of 20 mm is welded with the welding wires in Examples 1-5 without preheating, with the groove type being 45° single-sided V type and the gap being 12 mm, wherein an 80% Ar+20% $CO_2$ shielding gas is used in Examples 1-3, an 80% Ar+15% $CO_2$+5% $O_2$ shielding gas and a 95% Ar+5% $O_2$ shielding gas are used in Examples 4 and 5, the interpass temperature is controlled between 100° C. and 165° C., the welding heat input is controlled at 8-13 kJ/cm, and multi-layer and multi-pass welding is carried out on the base metal, ensuring the welds to be fully penetrated. After welding, the weld metals are subjected to an all-element spectral analysis, a longitudinal tensile test and a Charpy V-notch impact test of a full sample size, with the parameters being shown in Table 3 in detail.

Table 3 lists the mechanical property parameters of the weld metals obtained after gas shielded welding with the welding wires in Examples 1-5 of the present invention.

TABLE 1

(wt. %, the balance being Fe and other inevitable impurities in addition to elements P, S, Al, O and H)

| No. | C | Si | Mn | Cu | Cr | Mo | Ni | Ti | V | N |
|---|---|---|---|---|---|---|---|---|---|---|
| 1 | 0.085 | 0.78 | 1.90 | 0.06 | 0.36 | 0.49 | 1.66 | 0.16 | 0.02 | 0.008 |
| 2 | 0.105 | 0.70 | 1.85 | 0.13 | 0.28 | 0.42 | 1.38 | 0.11 | 0.04 | 0.011 |
| 3 | 0.093 | 0.75 | 1.85 | 0.16 | 0.23 | 0.60 | 1.52 | 0.15 | 0.01 | 0.010 |
| 4 | 0.08 | 0.80 | 1.95 | 0.10 | 0.40 | 0.20 | 1.80 | 0.20 | 0.01 | 0.013 |
| 5 | 0.12 | 0.65 | 1.80 | 0.19 | 0.20 | 0.31 | 1.30 | 0.08 | 0.05 | 0.007 |

TABLE 3

| Example | $C_{eq}$ | $P_{cm}$ | Yield strength $R_{el}$ (MPa) | Tensile strength $R_m$ (MPa) | Elongation A (%) | Charpy V-notch impact energy at −20° C. (KV2, J) | | | Mean value | Charpy V-notch impact energy at −40° C. (KV2, J) | | | Mean value |
|---|---|---|---|---|---|---|---|---|---|---|---|---|---|
| 1 | 0.683 | 0.286 | 865 | 966 | 19 | 84 | 105 | 78 | 89 | 63 | 53 | 51 | 56 |
| 2 | 0.653 | 0.290 | 810 | 909 | 18 | 108 | 90 | 87 | 95 | 62 | 65 | 85 | 71 |
| 3 | 0.671 | 0.288 | 950 | 1020 | 21 | 125 | 114 | 97 | 112 | 93 | 98 | 51 | 81 |
| 4 | 0.647 | 0.269 | 919 | 953 | 18 | 114 | 156 | 97 | 122 | 93 | 98 | 49 | 80 |
| 5 | 0.619 | 0.289 | 941 | 1022 | 21 | 87 | 97 | 91 | 92 | 57 | 42 | 58 | 52 |

As can be seen from Table 3, for the weld metals obtained by gas shielded welding with the welding wires in the above-described Examples 1-5, the yield strengths ($R_{el}$) are all ≥810 MPa, the tensile strengths ($R_m$) are all ≥909 MPa, the elongations A are all ≥18%, and the mean values of Charpy V-notch impact energy at −20° C. are all ≥89 J and the mean values of Charpy V-notch impact energy at −40° C. are all ≥52 J; furthermore, the carbon equivalents $C_{eq}$ of the weld metals are all less than 0.7, and the welding cold crack indexes $P_{cm}$ are all less than 0.3%, which indicates that the welding wire of the present invention has a higher strength, a greater impact toughness, a better plasticity and a better crack resistance, with the mechanical properties being all capable of matching superhigh strength steels having a grade of 90 kg or higher, and is a gas shielded welding material applicable to the manufacturing fields of engineering machinery, hydropower engineering, oceanographic engineering, commercial vehicles, etc.

It can be seen by analysis that the addition of titanium in the welding wire can allow carbon nitride compounds of titanium to be precipitated at a higher temperature and prevent austenite grains from growing, and plays a role of grain refining. With the decrease in temperature, vanadium precipitates on the periphery of carbon nitride compounds of titanium to form (Ti,V)(C,N) compounds. At a lower temperature, fine carbon nitride compounds of vanadium continue to precipitate inside the matrix and have a precipitation strengthening effect.

In addition, FIG. 1 shows the microstructure of a weld surface of a deposited metal obtained by welding with the welding wire in Example 1. As shown in FIG. 1, the microstructure of the weld surface of the deposited metal is completely bainite.

Figure 2:
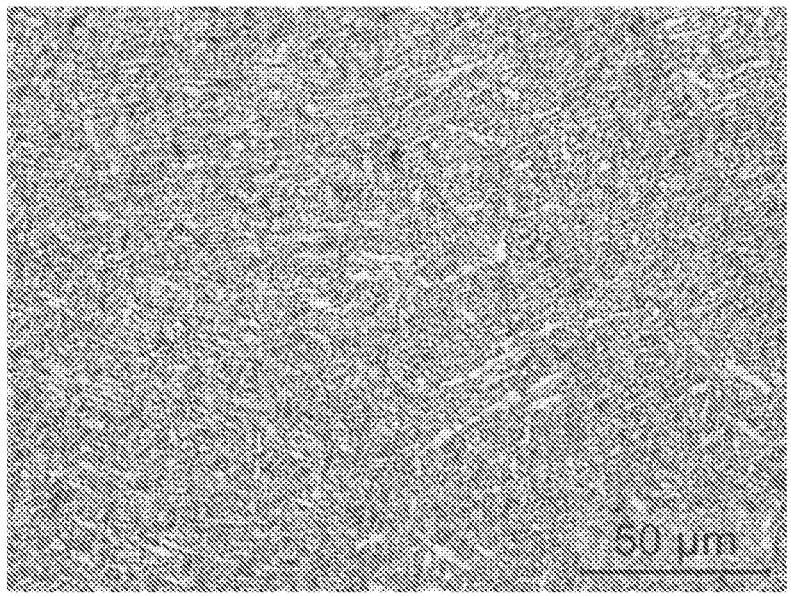
FIG. 2 is a microstructure photograph of a weld surface of a deposited metal obtained from a welding wire in Example 2.

FIG. 2 shows the microstructure of a weld surface of a deposited metal obtained by welding with the welding wire in Example 2. As shown in FIG. 2, the microstructure of the weld surface of the deposited metal is mainly bainite, and further comprises irregular ferrite in a volume fraction of 2-5%.

Figure 3:
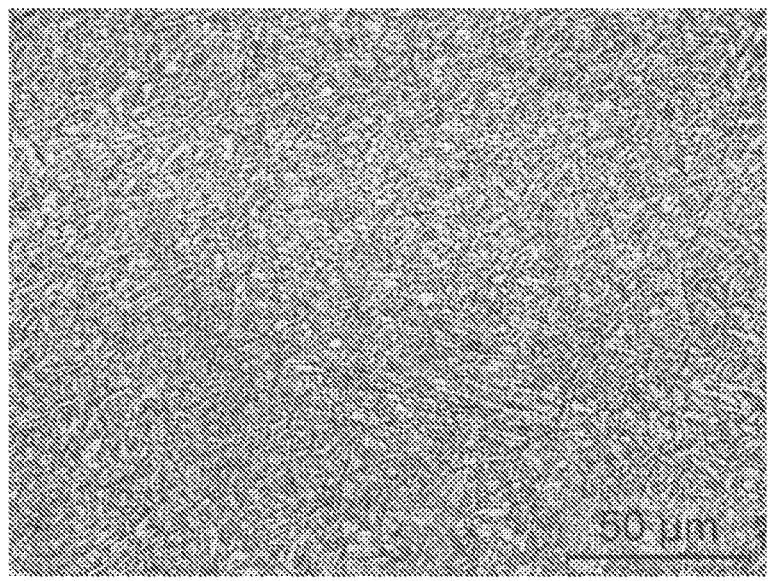
FIG. 3 is a metallographic image of the structure of a weld interpass heat affected zone of a deposited metal obtained from a welding wire in Example 3.

FIG. 3 shows the structure of the weld interpass heat affected zone of the deposited metal obtained by welding with the welding wire in Example 3. As shown in FIG. 3, the structure of the weld interpass heat affected zone of the deposited metal is completely lower bainite.

Figure 4:
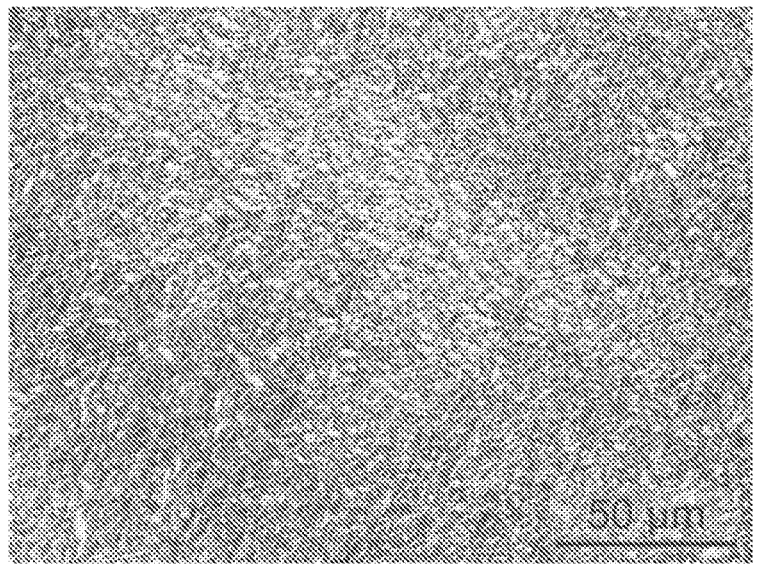
FIG. 4 is a metallographic image of the structure of a weld interpass heat affected zone of a deposited metal obtained from a welding wire in Example 4.

FIG. 4 shows the structure of the weld interpass heat affected zone of the deposited metal obtained by welding with the welding wire in Example 4. As shown in FIG. 4, the structure of the weld interpass heat affected zone of the deposited metal is completely lower bainite.

Figure 5:
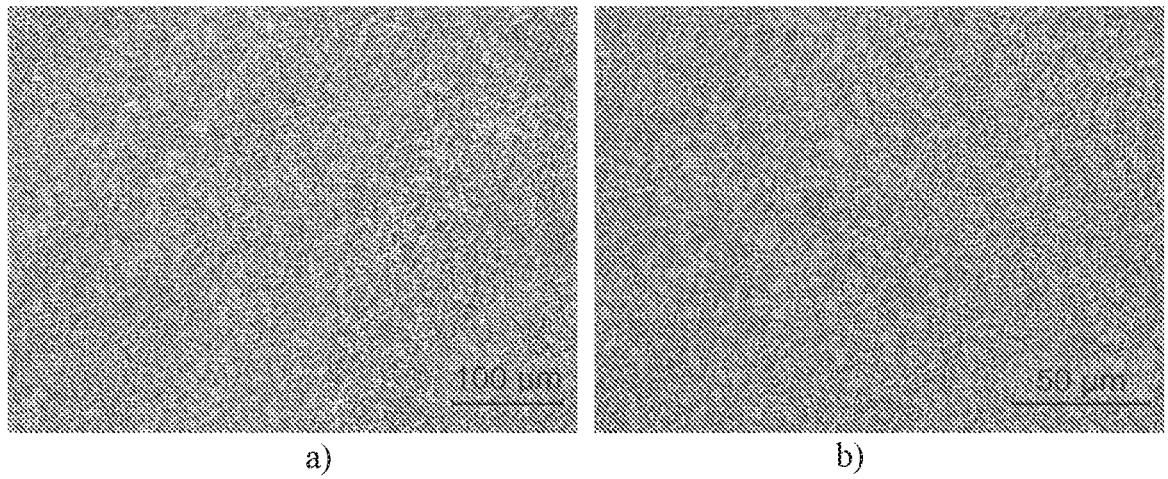
FIG. 5 is a metallograph of a weld surface structure of a typical deposited metal.
Figure 6:
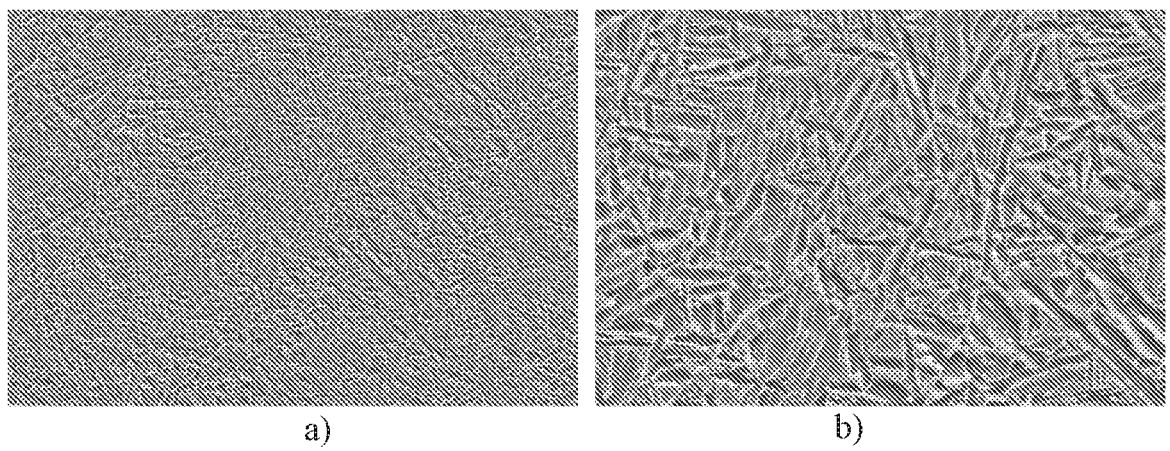
FIG. 6(a) is a 1000-fold scanning electron micrograph of a weld surface of a typical deposited metal.
FIG. 6(b) is a 3000-fold scanning electron micrograph of the weld surface of the typical deposited metal.
Figure 7:
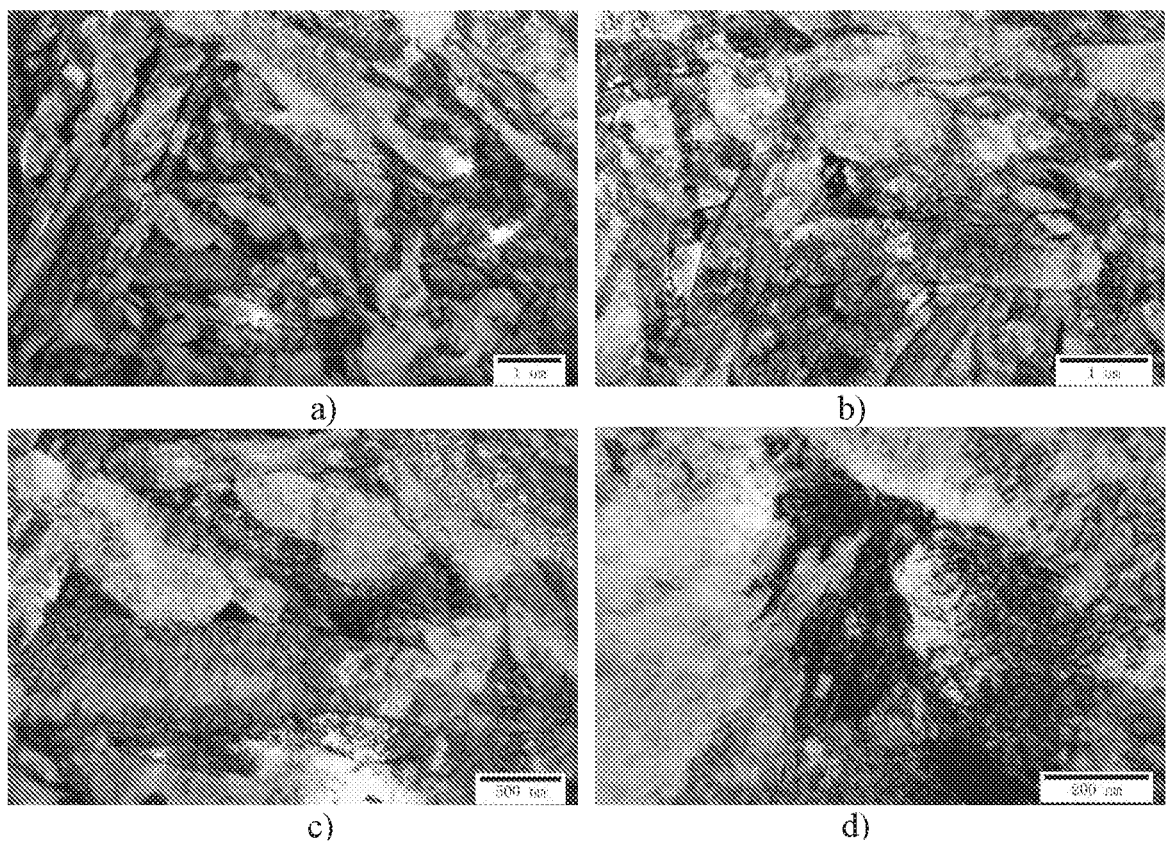
FIG. 7(a) is a 6000-fold transmission electron micrograph of a weld surface of a typical deposited metal.
FIG. 7(b) is an 8000-fold transmission electron photograph of a weld surface of a typical deposited metal.
FIG. 7(c) is a 15000-fold transmission electron micrograph of the weld surface of the typical deposited metal.
FIG. 7(d) is a 50000-fold transmission electron micrograph of the weld surface of the typical deposited metal.
Figure 8:
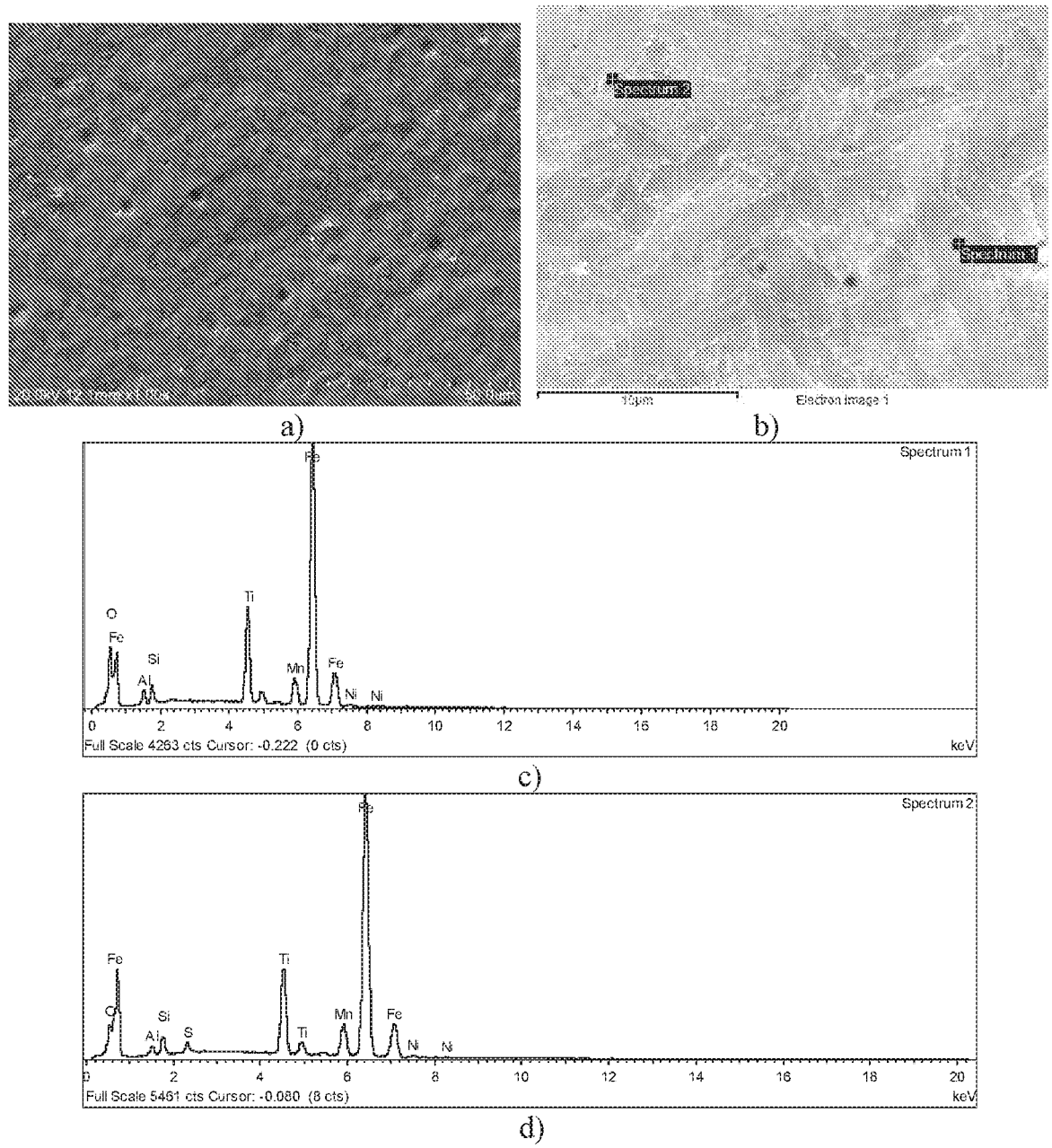
FIG. 8(a) is a 1000-fold scanning electron micrograph of a weld surface of a typical deposited metal.
FIG. 8(b) is a scanning electron micrograph and energy spectrum test point positions of a weld surface of a typical deposited metal.
FIG. 8(c) is the energy spectrum test result of test point 1 (Spectrum 1) on the weld surface of the typical deposited metal.
FIG. 8(d) is the energy spectrum test result of test point 2 (Spectrum 2) on the weld surface of the typical deposited metal.

FIGS. 5 and 6 provide the metallograph and the SEM photograph of a typical surface weld, and it can be seen that the structure thereof is composed of bainite+lath martensite+a small amount of quasi-polygonal ferrite, with the ferrite lath being finer. FIG. 7 is a TEM photograph of a surface weld, and the structure thereof being mainly composed of martensite. FIG. 8(a) is an SEM photograph of a weld metal, and it can be observed that there are dispersedly distributed fine precipitates. FIGS. 8(b), (c) and (d) provide the analysis results of the precipitate components using EDS, and it can be seen that titanium is contained therein. Since the precipitates of vanadium are too fine, it is difficult to determine the composition thereof by means of detection.

It should be noted that those listed above are merely specific examples of the present invention, and it is obvious that the present invention is not limited to the above examples, and may have many similar variations thereof. All the variants that can be directly derived from or associated with the contents disclosed in the present invention by a person skilled in the art should fall within the scope of protection of the present invention.

The invention claimed is:

1. A superhigh strength gas shielded welding wire containing V, characterized in that a mass percentage contents of chemical elements of the superhigh strength gas shielded welding wire are: 0.08-0.12% of C, 0.65-0.80% of Si, 1.80-1.95% of Mn, 0<Cu 0.25%, 0.20-0.40% of Cr, 0.2-0.6% of Mo, 1.30-1.80% of Ni, 0.08-0.20% of Ti, 0.01-0.05% of V, 0.0070-0.0130% of N, and a balance of Fe and other inevitable impurities,
wherein the superhigh strength gas shielded welding wire containing V is characterized by further satisfying 0.20%≤Cr+Cu≤0.42%, and
wherein the superhigh strength gas shielded welding wire containing V has a tensile strength $R_m$ of 909-1022 MPa.

2. The superhigh strength gas shielded welding wire containing V of claim 1, characterized by further satisfying 0.46%≤Cr+V+Mo≤0.88%.

3. The superhigh strength gas shielded welding wire containing V of claim 1, characterized by further satisfying 0.10%≤V+Ti≤0.22%.

4. The superhigh strength gas shielded welding wire containing V of claim 1, characterized in that an interpass temperature is controlled between 100° C. and 165° C., a welding heat input is 8-13 kJ/cm, and a weld surface structure of a deposited metal obtained from said superhigh strength gas shielded welding wire containing V is bainite.

5. The superhigh strength gas shielded welding wire containing V of claim 4, characterized in that the weld surface structure of said obtained deposited metal further comprises irregular ferrite in a volume fraction of 2-5%.

6. The superhigh strength gas shielded welding wire containing V of claim 1, characterized in that an interpass temperature is controlled between 100° C. and 165° C., a welding heat input is 8-13 kJ/cm, and structures of weld interpass heat affected zones of a deposited metal obtained from said superhigh strength gas shielded welding wire containing V are all lower bainite.

7. The superhigh strength gas shielded welding wire containing V of claim 1, characterized in that an interpass temperature is controlled between 100° C. and 165° C., a welding heat input is 8-13 kJ/cm, and a deposited metal obtained from said superhigh strength gas shielded welding wire containing V has precipitates, the precipitates being Ti(C,N) and V(C,N).

8. A method for manufacturing the superhigh strength gas shielded welding wire containing V of claim 1, characterized by comprising steps of smelting, refining, casting, hot rolling, slow cooling, spinning into wire rods, pickling, rough drawing, heat treatment, fine drawing and copper plating, wherein a heat treatment temperature in said heat treatment step is 680-720° C.

9. The superhigh strength gas shielded welding wire containing V of claim 1, characterized in that a deposited metal obtained from said superhigh strength gas shielded welding wire containing V has a tensile strength $R_m$ of 880-1060 MPa.

* * * * *